United States Patent [19]

Metz

[11] 4,293,340
[45] Oct. 6, 1981

[54] COMPOSITION AND PROCESS FOR STABILIZING SOIL

[75] Inventor: Fred L. Metz, Concord, Ohio

[73] Assignee: Diamond Shamrock Corporation, Dallas, Tex.

[21] Appl. No.: 198,634

[22] Filed: Oct. 20, 1980

Related U.S. Application Data

[63] Continuation-in-part of Ser. No. 91,056, Nov. 5, 1979, abandoned.

[51] Int. Cl.³ .............................................. C09J 1/02
[52] U.S. Cl. ........................................ 106/74; 106/84; 106/DIG. 900; 166/293; 166/294; 252/317
[58] Field of Search .................. 106/84, 74, DIG. 900

[56] References Cited

U.S. PATENT DOCUMENTS

| | | | |
|---|---|---|---|
| 2,968,572 | 1/1961 | Peeler | 106/74 |
| 3,028,340 | 4/1962 | Gandon et al. | 106/84 X |
| 3,202,214 | 8/1965 | McLaughlin | 166/293 |
| 3,306,756 | 2/1967 | Miller | 106/84 |
| 3,306,758 | 2/1967 | Miller | 106/84 |
| 3,864,137 | 2/1975 | Van Bonin et al. | 106/84 X |

OTHER PUBLICATIONS

Glassev, Lesley S. Deut et al. "Glyoxal as a Possible Curing Agent for Paints Boxed on Sodium Silicate", J. Chem. Tech. Biotechnol. 29, 1979, pp. 283-289.

Primary Examiner—Helen M. McCarthy
Attorney, Agent, or Firm—Helen P. Brush

[57] ABSTRACT

An easily pumpable, liquid alkali metal silicate composition of controlled gelling characteristics comprises water, an alkali metal silicate, glyoxal optionally a Group I-III metal salt, e.g., calcium chloride and from 0.025 to 0.18 mole of hydrogen peroxide per liter of composition. This composition finds particular utility for stabilizing soil, the treated soil exhibiting enhanced load-bearing capacity.

15 Claims, 2 Drawing Figures

COMPOSITION AND PROCESS FOR STABILIZING SOIL

CROSS-REFERENCE TO RELATED APPLICATION

This application is a continuation-in-part of my copending application, Ser. No. 91,056, filed Nov. 5, 1979, now abandoned.

BACKGROUND OF THE INVENTION

1. Field of the Invention

This invention relates to a composition and process for controlling the gelation time of alkali metal silicate-containing compositions. More particularly, it relates to a composition and process for controlling the gelation time of an alkali metal silicate-containing composition useful for stabilizing soil by incorporating therein certain compounds which modify the gel time of the silicate composition, the resulting gelled composition being characterized by enhanced load-bearing capacity.

2. Description of the Prior Art

It has long been known to produce gelled, cement-like masses from aqueous solutions of alkali metal silicates by the addition of salts of metals other than alkali metals, for example, aluminum, zinc, cadmium or iron. As described in U.S. Pat. No. 2,968,572 (Peeler), issued Jan. 17, 1961, it is further known to render soil impermeable to fluid and/or to strengthen it by injecting into said soil a composition comprising an aqueous alkali metal, e.g., sodium silcate, and a soluble amide such as formamide, acetamide, propionamide, butyramide and the like, said composition likewise containing, if desired, a reactive salt such as calcium chloride or sodium chloride to further customize the gelation time of the silicate. During gelation of the composition and thereafter, however, gaseous ammonia is liberated from the silicate-amide reaction, constituting a hazard to those working nearby, particularly in confined areas.

In U.S. Pat. No. 3,306,758 (Miller), issued Feb. 28, 1967, there is described an alkali metal silicate-containing soil stabilizing composition improved over that set forth in the aforesaid U.S. Pat. No. 2,968,572, in that no significant quantities of ammonia vapors are released upon applying and reacting the silicate and amide components. This improvement is effected by incorporating a lower alkyl aldehyde, e.g., formaldehyde, acetaldehyde and the like, or a cyclic derivative thereof such as trioxane, into the composition as a binding or complexing agent for the ammonia generated during the gelling reaction. Further, in U.S. Pat. No. 3,306,756, likewise issued to Miller on Feb. 28, 1967, there is described an alkali metal silicate-amide soil stabilization composition of consistently controllable gelation time, which composition additionally incorporates as an accelerator for said gelling reaction, either a carboxylic acid or ester thereof, a ketone, an alcohol, a linear aldehyde other than formaldehyde, including the linear polymers thereof, dioxane, mixtures of these compounds or mixtures of formaldehyde with at least one of said compounds. Still further, U.S. Pat. No. 3,028,340 (Gandon et al.), issued April 3, 1962, describes and claims a composition suitable for soil stabilization comprising an alkali metal silicate in combination with the linear dialdehyde, glyoxal, as hardener for the silicate. Although safer to apply than the aforesaid silicate-formamide formulations since it generates no hazardous ammonia vapors, the silcate-glyoxal composition, however, does not cure to gels of significant load-bearing capacity.

SUMMARY OF THE INVENTION

It has now been found that a composition of improved gelling character, resulting in enhanced load-bearing capacity, may be obtained by admixing certain prescribed quantities of hydrogen peroxide with the alkali metall silicate-glyoxal composition according to the aforesaid patent, U.S. Pat. No. 3,028,340. Accordingly, the present invention is directed to an easily pumpable and injectable soil-stabilizing composition of customized gelling characteristics, which composition comprises aqueous alkali metal silicate in combination with prescribed ratios of glyoxal and hydrogen peroxide. With this composition, programmed soil stabilization may be accomplished simply and economically and the stabilized soil is found to have enhanced load-bearing capacity, i.e., compressive strength, compared to strata treated with soil stabilizing compositions of the prior art.

BRIEF DESCRIPTION OF THE DRAWINGS

Other advantages of the invention will become apparent upon reading the following detailed description and upon reference to the drawings in which.

DESCRIPTION OF THE PREFERRED EMBODIMENTS

Figure 1:
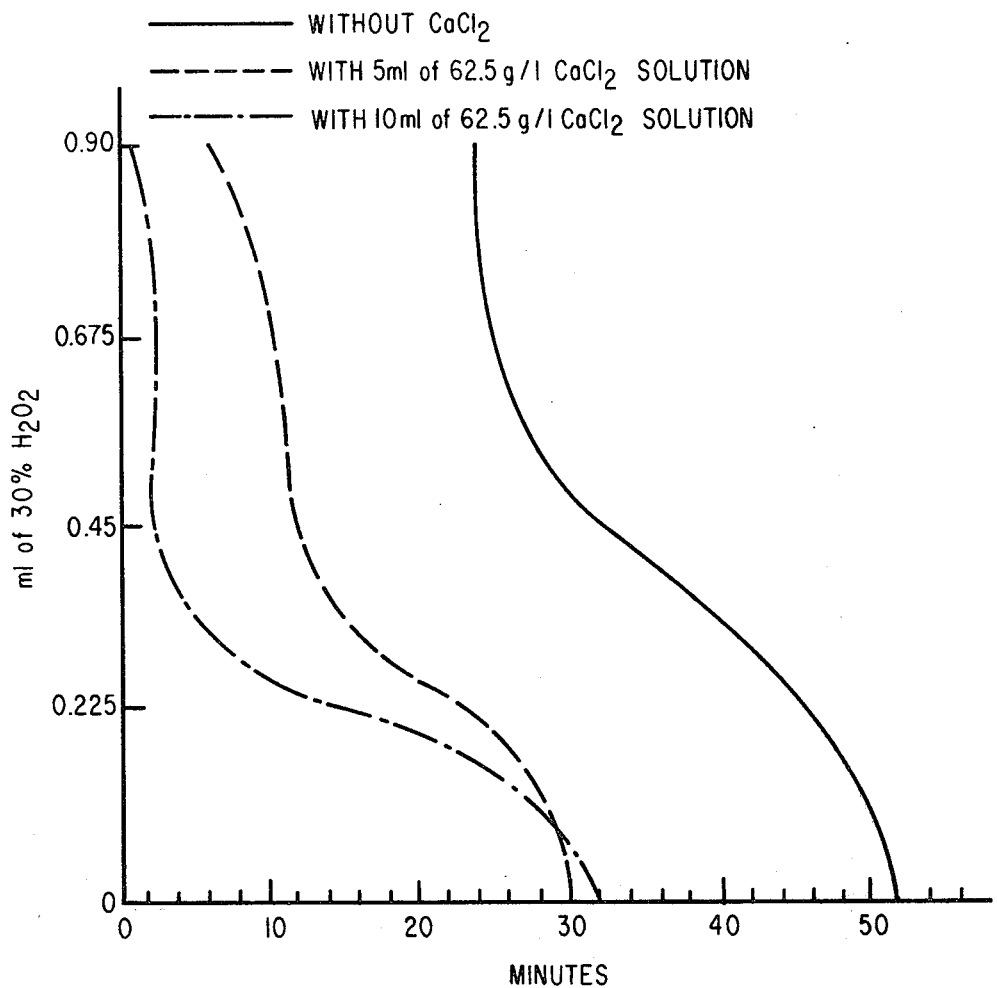
FIG. 1 is a graph wherein the gelling or set times of silicateglyoxal solutions tested are plotted against the hydrogen peroxide concentrations used therein.

As used herein in the specification and claims, the term "alkali metal silicate" is intended to refer to alkali metal silicates having an alkali metal oxide:silicon dioxide weight ratio within the range from about 1.0:3.0–4.0, notably, sodium silicates having a sodium oxide:silicon dioxide weight ratio within the range from about 1.0:3.0–4.0, preferably about 1.0:3.5. In practice, either an anhydrous alkali metal silicate, e.g., sodium metasilicate or a silicate solution as commercially obtained, may be employed herein as the alkali metal silicate component. The anhydrous material will, of course, be dissolved in sufficient water to provide a solution of the desired solids concentration. An especially preferred material is an aqueous sodium silicate having a sodium oxide:silicon dioxide ratio of about 1.0:3.2–3.3, and having a $Na_2O\text{-}SiO_2$ solids content of about 25 to 50 percent, most preferably, a $Na_2O\text{-}SiO_2$ solids content of about 35 to 45 percent, by weight. The term "alkali metal," as used in the specification and claims, is intended to refer to the various alkali metals, i.e., sodium, potassium lithium, rubidium, cesium and mixtures thereof. Silicates of potassium and sodium are more generally available. In particular, sodium silicate solutions, being commerically available in a wide variety of solids concentrations and $Na_2O:SiO_2$ are more widely used and are presently preferred in practice of the invention. Accordingly, particular reference is made hereinafter to sodium silicates. The silicate may be employed undiluted as purchased, or it may be diluted with water.

In general, the glyoxal component of the composition may be incorporated therein either as an anhydrous solid or as a 40 percent aqueous solution, both of which forms are available commerically. Being more convenient and easily handled, however, the aqueous glyoxal solution is preferred. Generally, from about 0.25 mole to 1.05 moles of glyoxal may be employed per liter of total composition to provide, in combination with the hydrogen peroixde activator, an easily pumpable soil-stabilizing composition which, in turn, produces treated soil strata of the enhanced load-bearing capacity desired. In presently preferred practice, from about 0.35 to 0.70 mole of glyoxal are employed per liter of total composition.

The quantity of hydrogen peroxide incorporated in the composition is critical for providing pumpable consistency thereto as well as for imparting its desired gelling characteristics. Together with the proper concentration of glyoxal, the correct hydrogen peroxide concentration likewise contributes to the enhanced load-bearing capacity to soil treated with the composition. In practice of this invention, is is essential to employ hydrogen peroxide in an amount sufficient only to oxidize the quantity of the glyoxal component used. No excess peroxide should be present which could be decomposed by the heat of the exothermic oxidation reaction, promoting, in turn, formation of cellular silicate composition in the treated soil. In general, use of from about 0.02 to about 0.7 mole of hydrogen peroxide for each mole of glyoxal will effect the oxidation reaction without incorporating any significant quantities of excess peroxide. In using the higher peroxide levels within this range, however, gelation of the silicate is found to proceed too rapidly, making pumping of the composition into the soil site extremely difficult, if not impossible. On the other hand, by using low levels of peroxide, i.e., from about 0.04 to about 0.3 mole per each mole of glyoxal component, setting of the resulting silicate composition proceeds more slowly. Thus, this composition is well adapted to commercial application as it remains workable or pumpable for a sufficient period of time to allow for its easy injection into the soil prior to gelation. Accordingly, use of 0.04–0.3 mole of hydrogen peroxide per mole of glyoxal is presently preferred in the soil-stabilizing silicate composition of this invention.

In addition to the silicate-glyoxal-hydrogen peroxide compositions of this invention, also contemplated are silicate compositions for specialized applications, which compositions contain, in addition to glyoxal and hydrogen peroxide, a ractive salt capable of reacting with the alkali metal silicate rapidly to form, with the silicate, a completely or substantially water-insoluble gel. In some applications, for example, in the treatment of soil at a depth below the existing water level, ground moisture present could be a disadvantage in dissolving the initially formed gel, thus effectively inhibiting the desired soil stabilization. Accordingly, in such a situation, it is a preferred practice of this invention that the silcate-glyoxal-hydrogen peroxide composition employed further contain a reactive salt for the purpose of imparting a high degree of initial water-insolubility to the silicate gel which forms therefrom. The term "reactive salt" is intended to mean those Group I-III metal salts which chemically react with aqueous alkali metal silicate to produce a completely or substantially water-insoluble gel. Specific reactive salts include sodium aluminate, aluminum chloride, copper sulfate, zinc chloride and calcium chloride, with calcium chloride being preferred. When a reactive salt is used, it generally is incorporated as an aqueous solution wherein the concentration of salt is within the range of from about 25 grams/liter of solution up to saturation. The amount of reactive salt employed should be insufficient to form a satisfactory gel if used alone with the silicate. Further, as the reactive salt, particularly calcium chloride, forms insoluble complexes with the silicate which then will precipitate from the system, care should be taken not to use highly excessive amounts of reactive salt. When employed, the amount of aqueous salt, e.g., a 5 weight/volume percent calcium solution, generally comprises 2 to 12 percent, preferably 5 to 10 percent, by volume of the total soil-stabilizing composition. On a molar basis, generally, from about 0.009 to 0.06 mole, and preferably, from about 0.02 to 0.05 mole of, e.g., calcium chloride, may be employed per liter of total composition. It is to be understood, of course, that a reactive salt need not be employed unless a high degree of gel water-insolubility is needed initially.

As described previously, the compositions of this invention incorporate at least sufficient water to render the compositions fluid. However, except in those instances where a dilute solution is desired for reasons of economy and/or to further enhance injectivity of the composition, its substantial dilution is to be avoided. Generally, at least a portion of the necessary water may advantageously be incorporated by using a commercial aqueous alkali metal silicate as described above, with additional water being supplied, if desired, as by admixture of the water with the glyoxal and/or with any reactive salt solution when employed.

It will be appreciated, of course, that the amounts of glyoxal, hydrogen peroxide, added water and reactive salt used in proportion to silicate, as well as the amount of soil treated with a given quantity of such a composition, varies widely depending upon the porosity, permeability and type of soil, nature of the substrata, if subsoil applications are intended, and the like. Accordingly, it generally is not feasible to define in terms of proportions a composition which represents an optimum material for use in all types of soil solidification and/or stabilization operations.

However, effective soil stabilization compositions of the present invention generally comprise, from about 10 to 70 percent, preferably about 30 to 50 percent, by volume, of an aqueous alkali silicate having an alkali metal oxide:silicon dixoide weight ratio within the range of 1.0:3.0–4.0; about 0.25 to 1.05 moles, preferably 0.35 to 0.70 mole of glyoxal per liter of composition; about 0.025 to 0.18 mole, preferably about 0.029 to 0.098 mole of hydrogen peroxide per liter of composition; and the balance of the soil-stabilizing composition being added water (water in addition to that separately admixed with either alkali silicate, glyoxal, hydrogen peroxide or reactive salt). No water need be added or it may be present in an amount of 0.5 to 8.5 times the volume of aqueous commerical silicate used. However, at temperatures greater than room temperature and when a high-strength gel is required, it is better to add little, if any, water to the aqueous commercial silicate.

The compositions of this invention may be used particularly for increasing the load-bearing capacity of soils, for arresting settlement and lateral movement of foundations, and for controlling the flow of water in subterranean engineering projects such as tunnels and mines. The term "soil, " as used in the specification and claims, is intended to refer to various types and compositions of soil, including sand, loam, porous or fissured rock and the like, for example, as described in pages 614-633 of Vol. 12 of the *Kirk-Othmer Encyclopedia of Chemical Technology*, First Ed.

The silicate, glyoxal and hydrogen peroxide soil-stabilizing compositions of this invention provide distinct advantages over soil-stabilizing compositions now known and used in the art. They are easily pumpable liquids which can be simply injected into the soil locus. They accomplish soil stabilization in customized gel times economically. The soil treated by these compositions exhibits significantly enhanced load-bearing capacity by comparison to that treated by prior stabilizing systems. Finally, in contrast to the presently used formulations, the soil-stabilizing compositions of this invention release no noxious fumes or other objectionable residues which could constitute a health hazard to persons applying them.

In additon to their utility as soil-stabilizing materials, the compositions of this invention may likewise be useful, either by themselves or in combination with other adjuvants, as coatings for imparting strength, waterimpermeability, fire resistance and/or chemical corrosion resistance to paper, roofing materials, wood, textiles, metal surfaces, water lines, and structural materials, e.g., building materials of various composition or insulation. They may also be employed as adhesives for binding, gluing, briquetting, pelletizing or agglomerating materials such as flooring, asbestos, roofing granules and the like, and as absorbing or adsorbing materials for encapsulating, confining or otherwise fixing liquids, gases or solids hazardous to the environment. Further, these compositions, either as gels or in hardened granular form, may find utility as chemical carriers, and as flocculants for purifying and disinfecting water.

In order that those skilled in the art may more completely understand the present invention and the preferred methods for carrying it into effect, the following specific examples are offered.

EXAMPLE 1

To each of a series of containers was added, at ambient temperature, 70 g (50 ml) of a commercially obtained liquid sodium silicate, grade 40 (1 $Na_2O:3.22$ $SiO_2$, average solids content 38.3 percent, by weight, 41.5° Be at 20° C.). A series of samples was prepared, each containing 46 ml of water and 4 ml of a 40 percent aqueous solution of glyoxal. A 30 percent hydrogen peroxide ($H_2O_2$) solution was mixed into the glyoxal samples in the amounts shown in the table below. The resulting glyoxal mixtures were each mixed into a separate sodium silicate sample and thoroughly blended. After blending, the mixtures were observed for gelling, with the set time, i.e., the time elapsed before the developing gel became sufficiently firm to support an inserted glass rod being recorded. The glass rod was 15.2 cm long with an O.D. of 0.95 cm and weighed 9 g. Additional silicate-glyoxal-$H_2O_2$ samples were prepared in which either 5 ml or 10 ml of calcium chloride solution was incorporated, the amount of water employed being decreased accordingly. The calcium chloride solution contained 62.5 g $CaCl_2 \cdot 2H_2O$/liter of solution. For comparison purposes, mixtures were prepared of like quantities of silicate and glyoxal only as controls. Using this procedure, results are as follows:

TABLE 1

| Sample | Additives | | Average Set Time Minutes |
|---|---|---|---|
| | $H_2O_2$[1] ml | $CaCl_2$[2] ml | |
| A | 0 | 0 | no gelling |
| B | 0.675 | 0 | 140 |
| C | 0 | 5 | 42 |
| D | 0.225 | 5 | 35 |
| E | 0.45 | 5 | 30 |
| F | 0.675 | 5 | 25 |
| G | 0.90 | 5 | 20 |
| H | 0 | 10 | 30 |
| I | 0.225 | 10 | 20 |
| J | 0.45 | 10 | 19 |
| K | 0.90 | 10 | 5 |

[1] 30% solution of $H_2O_2$
[2] 6.25 weight/volume % calcium chloride dihydrate solution The foregoing results indicate that gelling of the prescribed sodium silicate-glyoxal mixture was accomplished by the addition of an extremely small quantity of hydrogen peroxide. The initial gelling time was further accelerated by combinations of hydrogen peroxide and calcium chloride in the described amounts.

EXAMPLE 2

Following the procedure of Example 1, additional silicate samples were prepared, at ambient temperature, each incorporating 5 ml of the glyoxal solution with 45 ml of water. Varying amounts of hydrogen peroxide and/or calcium chloride were added to these samples as shown in Table 2 below. Silicate-glyoxal samples with no additives were likewise prepared and tested as controls. Also prepared for comparison were silicate-formamide samples as used heretofore in the art, hydrogen peroxide and/or calcium chloride being added to these solutions as accelerators. Results obtained are as follows:

TABLE 2

| Silicate Sample | Additives | | Average Set Time Minutes |
|---|---|---|---|
| | $H_2O_2$[2] ml | $CaCl_2$[2] ml | |
| 5 ml Glyoxal[1] Solution | 0 | 0 | no gelling |
| | 0.45 | 0 | 105 |
| | 0.90 | 0 | 30 |
| | 0 | 5 | 38 |
| | 0 | 10 | 28 |
| | 0.225 | 5 | 25 |
| | 0.45 | 5 | 20 |
| | 0.90 | 5 | 10 |
| | 0.45 | 10 | 5 |
| | 0.45 | 20 | 2 |
| 5 ml Formamide | | | |
| | 0 | 0 | >1000 |
| | 0.45 | 0 | 775 |
| | 0.90 | 0 | 296 |
| | 0 | 5 | 220 |
| | 0 | 10 | 53 |
| | 0.225 | 5 | 150 |
| | 0.45 | 10 | 15 |

[1] 40 weight % aqueous solution
[2] As described previously.

These results show that the gelling time of the silicate-glyoxal solutions was accelerated by the addition of hydrogen peroxide with and without calcium chloride. They also show that silicate-formamide mixtures can be caused to gel as rapidly as the silicate-glyoxal solutions by the addition thereto of hydrogen peroxide with and without calcium chloride. However, release of ammonia vapors from such mixtures makes use of silicate-formamide soil-stabilizing compositions objectionable and oftentimes hazardous.

EXAMPLE 3

Again following the procedure of Example 1, silicate samples were prepared incorporating 6 ml of the glyoxal solution together with 44 ml of water and varying amounts of hydrogen peroxide and calcium chloride as listed in the following Table 3. As controls, silicate-glyoxal samples with no additives were also prepared and tested. Results obtained are as follows:

TABLE 3

| Silicate Sample | Additives | | Average Set Time Minutes |
|---|---|---|---|
| | $H_2O_2$[1] ml | $CaCl_2$[1] ml | |
| 6 ml Glyoxal[1] Solution | 0 | 0 | 52 |
| | 0.225 | 0 | 45 |
| | 0.45 | 0 | 32 |
| | 0.675 | 0 | 25 |
| | 0.90 | 0 | 24 |
| | 0 | 5 | 30 |
| | 0 | 10 | 32 |
| | 0.225 | 5 | 23 |
| | 0.45 | 5 | 12 |
| | 0.90 | 5 | 6 |
| | 0.225 | 10 | 15 |
| | 0.45 | 10 | 2 |
| | 0.90 | 10 | 1 |

[1]As described previously.

As observed in the previous examples, the gelling time of silicate-glyoxal solutions of this example was accelerated by the addition of hydrogen peroxide with and without calcium chloride. The faster gelling times obtained are illustrated in the accompanying FIG. 1 wherein the gelling or set times of the different silicate-glyoxal solutions tested are plotted against the hydrogen peroxide concentrations used. The set times of silicate-glyoxal-hydrogen peroxide formulations which further contain calcium chloride are also graphically illustrated to indicate the accelerating additive effect of calcium chloride on the gelling time of compositions of this invention.

EXAMPLE 4

This example illustrates that the gel or set time of a silicate composition can be customized and adapted to a particular application by varying its preparation temperature.

For the test, a typical composition was prepared containing, on a volume basis, 40 percent Grade 40 sodium silicate solution, 6 percent of 40 percent aqueous glyoxal, 0.15 percent of 3 percent hydrogen peroxide, 0.25 percent of a 5 percent calcium chloride solution and the balance, water. For comparison, other formulations prepared and observed contained the silicate, glyoxal and water but either no hydrogen peroxide or calcium chloride. Other formulations prepared as controls contained only the silicate, glyoxal and water. Each formulation was prepared as set forth in Example 1 i.e., by first blending the glyoxal-water mixtures with any hydrogen peroxide and/or calcium chloride to be incorporated, prior to admixing the additives with the aqueous silicate solutions. After blending was completed, the set times of the various formulations were observed with the following results:

TABLE 4

| Sample | Temperature °F. | 3% $H_2O_2$ ml | 5% $CaCl_2$ ml | Average Set Time Minutes |
|---|---|---|---|---|
| 1 | 50 | 5 | 5 | 74 |
| | 70 | 5 | 5 | 24 |
| | 100 | 5 | 5 | 4 |
| 2 | 50 | 5 | 0 | 165 |
| | 70 | 5 | 0 | 44 |
| | 100 | 5 | 0 | 6 |
| 3 | 50 | 0 | 5 | 135 |
| | 70 | 0 | 5 | 40 |
| | 100 | 0 | 5 | 7 |
| 4[1] | 50 | 0 | 0 | 200 |
| | 70 | 0 | 0 | 65 |
| | 100 | 0 | 0 | 13 |

[1]Control formulation of silicate, aqueous glyoxal and water.

As the above results indicate, the temperature at which silicate compositions of this invention are prepared significantly affects their set times in addition to the particular accelerator or combination of accelerators employed.

EXAMPLE 5

This example illustrates the improved load-bearing capacity, i.e., compressive strength, of soil treated by the silicate-glyoxal-hydrogen peroxide compositions of this invention compared to that treated by known silicate-formamide or silicate-glyoxal soil-stabilizing compositions of the prior art.

For the test, samples were prepared by mixing 20–40 mesh sand in a 10:3 ratio, by volume, with silicate soil-stabilizing compositions, each containing 50 ml of grade 40 sodium silicate, to which had been added varying quantities of reactants as shown in the table below. In each instance, the silicate-reactant solution was blended with the measured amount of sand until the mixture was uniform. Each mixture was then placed into a poly(vinyl chloride) cylindrical mold 5 cm in diameter and 5 cm high which was closed on one end. The filled molds were covered and allowed to harden for 24 hours, 72 hours, or 7 days. At the end of each prescribed time interval, the compressive strength of the samples was measured on an Instron Tester (Model 1123), applying the load at a rate of 5 Mm/minute and recording the total pressure (in pounds) which could be applied to each sample before structural damage occurred. The recorded pressure was converted to kilograms/cm$^2$. Using this procedure, results are as follows:

TABLE 5

| Sample | Reactants Added | Average Compressive Strength (Kilograms/cm$^2$) | | |
|---|---|---|---|---|
| | | 24 hours | 72 hours | 7 days |
| A | 6 ml Glyoxal[1] | 3.7 | 4.6 | — |
| B | 6 ml Glyoxal 0.45 ml 30% $H_2O_2$ | 7.1 | 6.9 | 20.9 |
| C | 5 ml Glyoxal 0.67 ml 30% $H_2O_2$ | 5.5 | 5.2 | 17.0 |
| D | 5 ml Formamide 10 ml 62.5 g/l $CaCl_2$ | 4.2 | 7.6 | 6.7 |
| E | 5 ml Formamide 5 ml 62.5 g/l $CaCl_2$ 0.90 ml 30% $H_2O_2$ | 4.8 | — | 10.8 |

[1]Forty percent solution glyoxal in water.

As the above results indicate, the addition of aqueous hydrogen peroxide to a silicate-glyoxal solution particularly enhances the aged compressive strength of sand treated with such silicate-reactant solutions. These data also show that moldings of sand admixed with the previously known silicate-formamide-calcium chloride formulations may exhibit, upon aging, compressive strengths which are significantly less than that of moldings incorporating the soil-stabilizing composition of this invention. These data further show that by incorporating hydrogen peroxide with the aforesaid prior art silicate-formamide-calcium chloride formulation, the compressive strength of sand admixed therewith may be noticeably enhanced upon aging.

Figure 2:
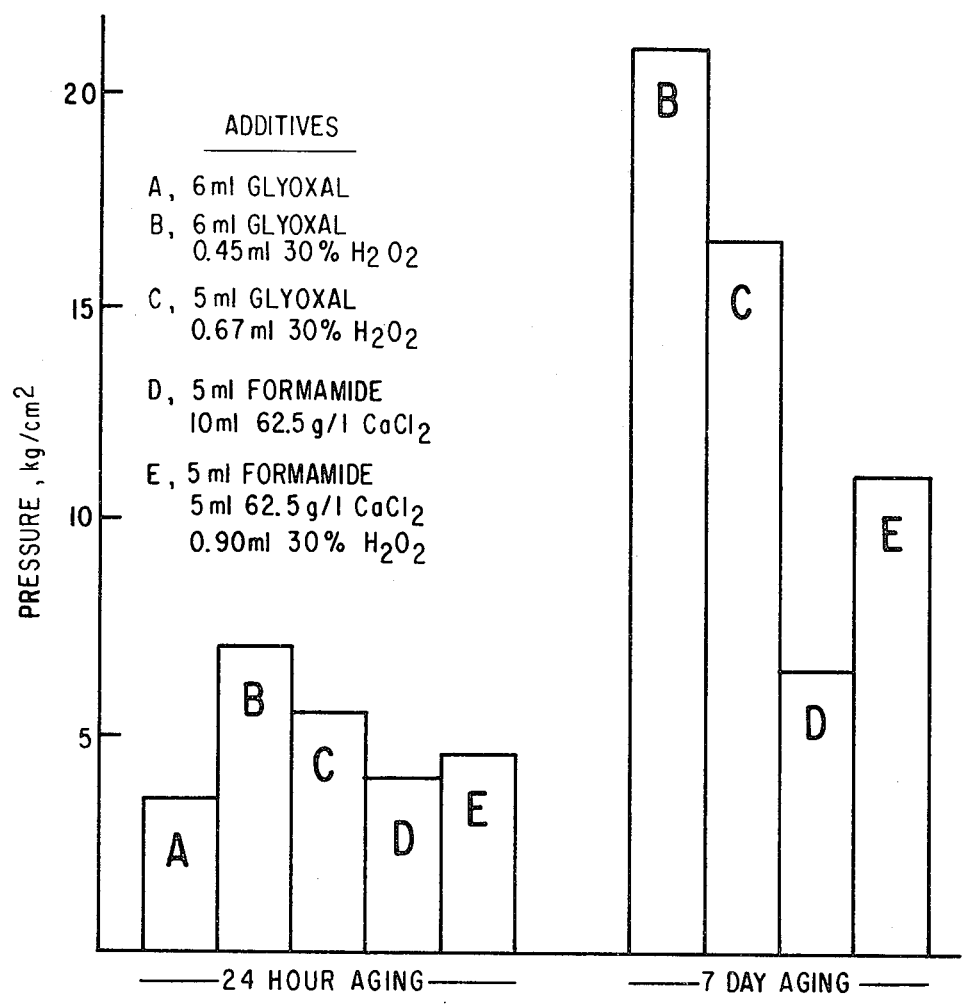
FIG. 2 is a block graph which shows the average compressive strength values determined after 24 hours and 7 days aging of sand treated with the silicate-reactant compositions of the invention compared to that admixed with a presently known and used silicate-formamide soil-stabilizing composition.

The average compressive strength values determined after 24 hours and 7 days aging of the sand-silicate mixtures of this example (samples A-E above) as illustrated in the accompanying FIG. 2. Graphically shown is the significantly enhanced load-bearing capacity attained by sand treated with the silicate-reactant compositions of this invention (Samples B and C) compared to that admixed with only glyoxal (Sample A) or with a typical silicate-formamide soil-stabilizing composition (Sample D) of the prior art.

What is claimed is:

1. In a liquid alkali metal silicate composition curable to a solid upon standing and comprising water, an alkali metal silicate and glyoxal, the improvement which comprises incorporating from 0.02 to 0.7 mole of hydrogen peroxide per mole of glyoxal, whereby the resulting composition exhibits, upon curing, improved compressive strength.

2. The liquid alkali metal silicate composition of claim 1 which comprises 10 to 70 percent, by volume, of an aqueous alkali metal silicate having an alkali metal oxide:silicon dioxide ratio of 1.0:3.0–4.0; about 0.25 to 1.05 moles of glyoxal per liter of composition; about 0.025 to 0.18 mole of hydrogen peroxide per liter of composition; and the balance water.

3. The composition of claim 2 wherein the aqueous alkali metal silicate contains 25 to 50 percent solids, by weight.

4. The composition of claim 2 which additionally contains a Group I-III metal salt reactive with the alkali metal silicate for imparting water-insolubility to the resulting silicate gel, which metal salt is sodium aluminate, aluminum chloride, copper sulfate, zinc chloride or calcium chloride.

5. The composition of claim 2 wherein the alkali metal silicate is sodium silicate.

6. The composition of claim 4 wherein the Group I-III metal salt is calcium chloride.

7. The composition of claim 2 which comprises, by volume, from 30 to 50 percent of aqueous sodium silicate having an $Na_2O:SiO_2$ ratio of 1.0:3.2–3.3 and containing 25 to 50 percent solids, by weight; from 0.35 to 0.70 mole of glyoxal per liter of composition; and from 0.029 to 0.098 mole of hydrogen peroxide per liter of composition.

8. The composition of claim 7 wherein the aqueous sodium silicate contains 35 to 45 percent solids, by weight.

9. The composition of claim 7 which additionally contains from 0.009 to 0.06 mole of calcium chloride per liter of total composition.

10. In a method of stabilizing soil which comprises contacting said soil with a sole liquid composition comprising 10 to 70 percent, by volume, of an aqueous alkali metal silicate having an alkali metal oxide:silicon dioxide ratio of 1.0:3.0–4.0; about 0.25 to 1.05 moles of glyoxal per liter of composition; and water, the improvement which comprises adding to said composition about 0.025 to 0.18 mole of hydrogen peroxide per liter of composition, whereby emhanced load-bearing capacity is exhibited by soil treated with the composition.

11. The method of claim 10 wherein the soil-stabilizing compostion additionally contains a Group I-III metal salt reactive with the alkali metal silicate for imparting water-insolubility to the resulting silicate gel, which metal salt is sodium aluminate, aluminum chloride, copper sulfate, zinc chloride or calcium chloride.

12. The method of claim 10 wherein the alkali metal silicate is sodium silicate.

13. The method of claim 10 wherein the alkali metal silicate contains 25 to 50 percent solids, by weight.

14. The method of claim 11 wherein the Group I-III metal salt is calcium chloride.

15. The method of claim 14 wherein the soil-stabilizing composition contains 30 to 50 percent, by volume, of an aqueous silicate having a sodium oxide:silicon dioxide ratio of 1.0:3.0–4.0; from about 0.35 to 0.70 mole of glyoxal per liter of total composition; from about 0.029 to 0.098 mole of hydrogen perioxide per liter of total composition; from about 0.02 to 0.05 mole of calcium chloride per liter of total composition; and the balance water.

* * * * *